United States Patent
Chung et al.

(10) Patent No.: US 11,556,163 B2
(45) Date of Patent: Jan. 17, 2023

(54) ELECTRONIC DEVICE INCLUDING CONNECTOR AND METHOD FOR CONTROLLING POWER TRANSMISSION/RECEPTION IN ELECTRONIC DEVICE

(71) Applicant: Samsung Electronics Co., Ltd., Suwon-si (KR)

(72) Inventors: Ilhyung Chung, Suwon-si (KR); Cheolho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 318 days.

(21) Appl. No.: 16/765,041

(22) PCT Filed: Nov. 28, 2018

(86) PCT No.: PCT/KR2018/014780
§ 371 (c)(1),
(2) Date: May 18, 2020

(87) PCT Pub. No.: WO2019/107894
PCT Pub. Date: Jun. 6, 2019

(65) Prior Publication Data
US 2020/0403433 A1    Dec. 24, 2020

(30) Foreign Application Priority Data
Nov. 28, 2017 (KR) .......................... 10-2017-0160658

(51) Int. Cl.
*G06F 1/3206* (2019.01)
*G06F 13/38* (2006.01)
(Continued)

(52) U.S. Cl.
CPC ........ *G06F 1/3206* (2013.01); *G06F 11/3027* (2013.01); *G06F 11/327* (2013.01); *G06F 13/382* (2013.01); *G06F 2213/0042* (2013.01)

(58) Field of Classification Search
CPC .. G06F 1/3206; G06F 11/221; G06F 11/3027; G06F 11/3058; G06F 11/32;
(Continued)

(56) References Cited

U.S. PATENT DOCUMENTS 11,074,212 B2 *  7/2021  Wen .................... G06F 13/4282
2008/0265838 A1 * 10/2008  Garg ........................ H02J 7/00
710/15

(Continued)

FOREIGN PATENT DOCUMENTS

KR    10-2005-0066076 A    6/2005
KR    10-2009-0003878 A    1/2009
(Continued)

OTHER PUBLICATIONS

Texas Instruments, USB Type-C and Power Delivery Multiport-Adapter Reference Design, Feb. 3, 2017.

*Primary Examiner* — Thomas J. Cleary
(74) *Attorney, Agent, or Firm* — Jefferson IP Law, LLP

(57) ABSTRACT

An electronic device according to various embodiments of the present invention may comprise: a connector comprising at least one power terminal for receiving power supplied from an external electronic device, and at least one data terminal for transmitting/receiving data to/from the external electronic device; and a processor comprising at least one sensing terminal connected to the at least one data terminal through at least one resistor, wherein the processor is configured to: when the external electronic device is connected to the electronic device through the connector, check a value corresponding to the voltage at the at least one data terminal, by using the at least one sensing terminal; and transmit, to (Continued)

the external electronic device, a control signal for controlling power supply from the external electronic device, on the basis of the value checked by means of the at least one sensing terminal. The various embodiments of the present invention may also include other embodiments.

14 Claims, 12 Drawing Sheets

(51) Int. Cl.
*G06F 11/32* (2006.01)
*G06F 11/30* (2006.01)

(58) Field of Classification Search
CPC .... G06F 11/324; G06F 11/325; G06F 11/326; G06F 11/327; G06F 13/382; G06F 13/4068; G06F 2213/0042; H02J 7/00714; H02J 7/00034; H02J 7/00045; H02J 7/04; H01R 24/60; H04M 1/725; H04M 1/724
See application file for complete search history.

(56) References Cited

U.S. PATENT DOCUMENTS

| | | | |
|---|---|---|---|
| 2009/0009140 A1 | 1/2009 | Kim | |
| 2010/0328087 A1* | 12/2010 | Kanno | H04M 11/062 340/661 |
| 2011/0316472 A1 | 12/2011 | Han et al. | |
| 2014/0013012 A1* | 1/2014 | Terlizzi | G06F 13/38 710/15 |
| 2016/0116509 A1* | 4/2016 | Kim | G01R 31/69 361/86 |
| 2016/0190794 A1* | 6/2016 | Forghani-Zadeh | H02H 9/045 361/86 |
| 2016/0336761 A1* | 11/2016 | Hsu | H02J 7/0029 |
| 2016/0349308 A1* | 12/2016 | Zhang | G06F 11/221 |
| 2017/0108910 A1* | 4/2017 | Goh | G06F 13/385 |
| 2017/0155214 A1* | 6/2017 | Shen | H01R 13/713 |
| 2018/0088648 A1* | 3/2018 | Otani | G06F 13/4282 |
| 2018/0183234 A1* | 6/2018 | Morii | H02H 9/044 |
| 2019/0155352 A1* | 5/2019 | Chung | H02J 7/0072 |
| 2019/0319447 A1* | 10/2019 | Mukhopadhyay | G06F 13/4295 |
| 2019/0319465 A1* | 10/2019 | Si | H02J 7/00309 |
| 2019/0341770 A1* | 11/2019 | Chen | H02H 7/20 |
| 2020/0153256 A1* | 5/2020 | Park | H02J 7/0036 |
| 2020/0274346 A1* | 8/2020 | Ding | H02H 5/042 |

FOREIGN PATENT DOCUMENTS

| | | |
|---|---|---|
| KR | 10-2012-0001280 A | 1/2012 |
| KR | 10-2013-0098515 A | 9/2013 |
| KR | 10-2014-0093058 A | 7/2014 |
| KR | 10-2016-0033950 A | 3/2016 |
| KR | 10-2016-0062775 A | 6/2016 |
| KR | 10-2017-0018714 A | 2/2017 |
| KR | 10-1735531 B1 | 5/2017 |

* cited by examiner

| | PIN No. | Signal Name | NOTE |
|---|---|---|---|
| 611a,611b | 1 | GND | GROUND |
| 612a,612b | 2 | SSTX+ | Super speed TX positive |
| 613a,613b | 3 | SSTX- | Super speed TX negative |
| 614a,614b | 4 | V$_{BUS}$ | USB cable charging power supply |
| 615a,615b | 5 | CC | Identification terminal |
| 616a,616b | 6 | D+ | + line of the differential bi-directional USB signal |
| 617a,617b | 7 | D- | - line of the differential bi-directional USB signal |
| 618a,618b | 8 | SBU | Side Band Use : additional purpose pin (ex: Audio signal, display signal, etc) |
| 619a,619b | 9 | V$_{BUS}$ | USB cable charging power supply |
| 620a,620b | 10 | SSRX- | Super speed RX negative |
| 621a,621b | 11 | SSRX+ | Super speed TX positive |
| 622a,622b | 12 | GND | GROUND |

FIG.6B

ELECTRONIC DEVICE INCLUDING CONNECTOR AND METHOD FOR CONTROLLING POWER TRANSMISSION/RECEPTION IN ELECTRONIC DEVICE

CROSS-REFERENCE TO RELATED APPLICATION(S)

This application is a National Phase Entry of PCT International Application No. PCT/KR2018/014780, which was filed on Nov. 28, 2018, and claims priority under 35 U.S.C. § 119(a) of Korean patent application number 10-2017-0160658, filed on Nov. 28, 2017 in the Korean Intellectual Property Office the disclosure of which is incorporated herein by reference in its entirety.

TECHNICAL FIELD

Various embodiments of the disclosure relate to an electronic device including a connector and a method for controlling power transmission/reception in an electronic device.

BACKGROUND ART

Recently, various electronic devices have been provided to a user, and the user can access various contents while carrying various electronic devices. Such an electronic device may include an interface (e.g., a connector) for connection with an external device, be connected to various external devices through the interface, and provide extended functions through the connection with the external devices. The electronic device may include various types of connectors according to various interfaces.

DETAILED DESCRIPTION OF THE INVENTION

Technical Problem

Among various types of connectors, a universal serial bus (USB) Type-C connector can supply power between an electronic device and an external device at a high speed.

When the electronic device and the external device are abnormally connected, short-circuiting may occur between terminals adjacent to each other in the connector by power supplied at a high speed in the abnormal connection state. In addition, when a high voltage is applied to the terminals in a state in which the short-circuiting has occurred, various parts connected to the connector may be burned out.

According to various embodiments of the disclosure, the electronic device may include a detection circuit connected to terminals for supplying power at a high speed in the connector, and determine whether short-circuiting has occurred in the connector through the detection circuit.

According to various embodiments of the disclosure, power supply with the external device may be controlled according to whether short-circuiting has occurred in the connector.

Technical Solution

An electronic device according to various embodiments of the disclosure may include: a connector including at least one power terminal configured to receive power supplied from an external electronic device, and at least one data terminal configured to transmit or receive data to or from the external electronic device; and a processor including at least one detection terminal connected to the at least one data terminal through at least one resistor, wherein the processor is configured to: when the external electronic device is connected to the electronic device through the connector, identify a value corresponding to a voltage of the at least one data terminal by using the at least one detection terminal; and transmit, to the external electronic device, a control signal for controlling power supply from the external electronic device, based on the value identified using the at least one detection terminal.

An electronic device according to various embodiments of the disclosure may include: a universal serial bus (USB) Type-C connector including at least one data terminal configured to perform high-speed data transmission/reception, and at least one power terminal configured to perform power supply; a processor including at least one first terminal connected to the at least one data terminal among a plurality of terminals of the USB Type-C connector; and a short-circuiting detection circuit connected between the at least one data terminal of the USB Type-C connector and the at least one first terminal of the processor, wherein the processor is configured to determine whether short-circuiting occurs in the at least one data terminal, based on a voltage value determined through the short-circuiting detection circuit.

An electronic device according to various embodiments of the disclosure may include: a universal serial bus (USB) Type-C connector including at least one data terminal configured to perform high-speed data transmission/reception with an external electronic device, and at least one power terminal configured to perform power supply; a processor including at least one first terminal connected to the at least one data terminal among a plurality of terminals of the USB Type-C connector; and a short-circuiting detection circuit connected between the at least one data terminal of the USB Type-C connector and the at least one first terminal of the processor, wherein the processor is configured to: when the external electronic device is connected to the electronic device through the USB Type-C connector, identify a value corresponding to a voltage of the at least one data terminal by using the at least one first terminal; and transmit a control signal for controlling power transmission/reception with the external electronic device to the external electronic device, based on the value identified using the at least one first terminal.

Advantageous Effects

According to various embodiments of the disclosure, an electronic device includes a short-circuiting detection circuit connected to terminals for supplying power at a high speed among terminals included in a connector, and can determine whether short-circuiting has occurred in a specific terminal through the short-circuiting detection circuit, and control power supply with an external device.

BRIEF DESCRIPTION OF DRAWINGS

FIGS. 6A and 6B are views for describing pins of a connector according to various embodiments of the disclosure.

MODE FOR CARRYING OUT THE INVENTION

Figure 1:
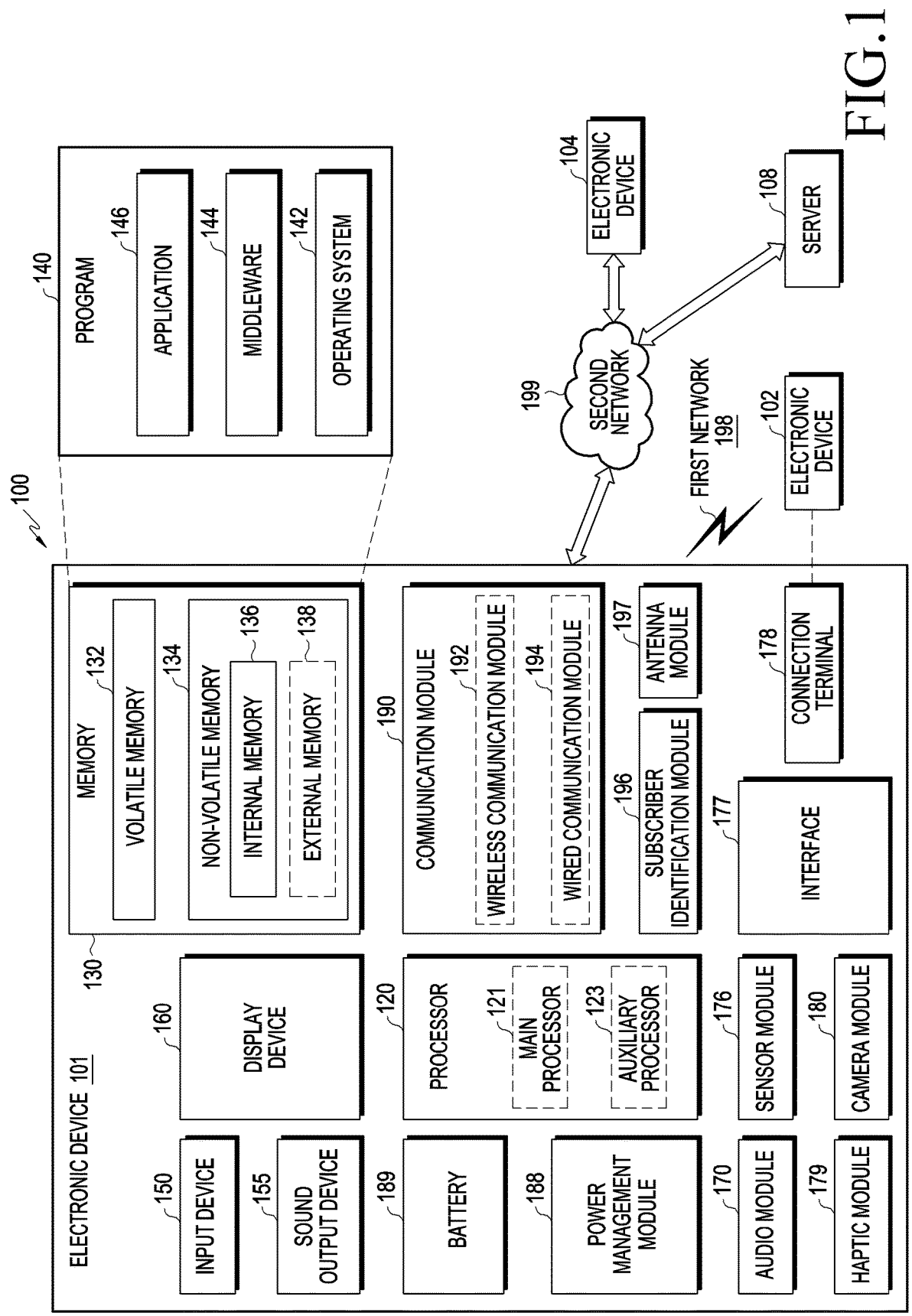
FIG. 1 illustrates an example of a network environment for controlling power between electronic devices according to various embodiments of the disclosure.

Hereinafter, various embodiments of the disclosure will be described with reference to the accompanying drawings. It should be appreciated that the embodiments and the terms used therein are not intended to limit the technological features set forth herein to particular embodiments and include various changes, equivalents, or alternatives for the corresponding embodiment. With regard to the description of the drawings, similar reference numerals may be used to designate similar or relevant elements. A singular expression may include the plural expression thereof, unless the relevant context clearly indicates otherwise. As used herein, each of such phrases as "A or B," "A/B," and "at least one of A and/or B" may include all possible combinations of the items enumerated together in a corresponding one of the phrases. As used herein, such terms as "a first", "a second", "the first", and "the second" may modify corresponding elements regardless of the order or importance thereof, and may be used to simply distinguish a corresponding element from another, and does not limit the elements. It is to be understood that if an element (e.g., a first element) is referred to as "(operatively or communicatively) coupled with," "coupled to," "connected with," or "connected to" another element (e.g., a second element), it means that the element may be coupled with the other element directly or via another element (e.g., third element). The expression "a plurality of" may mean at least two elements.

The expression "configured to" used in the disclosure may be interchangeably used with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the disclosure may include at least one of, for example, a smartphone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., watch, ring, bracelet, anklet, necklace, glasses, contact lens, or head-mounted device (HMD)), a fabric or clothing-integrated type (e.g., electronic clothing), a body-mounted type (e.g., skin pad, or tattoo), and a bio-implantable type (e.g., implantable circuit). According to some embodiments, the electronic device may include at least one of, for example, a television, a digital video disk (DVD) player, an audio, a refrigerator, an air conditioner, a vacuum cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to other embodiments, the electronic device may include at least one of various medical devices (e.g., various portable medical measuring devices (blood glucose monitoring device, heart rate monitoring device, blood pressure measuring device, body temperature measuring device, etc.), magnetic resonance angiography (MRA), magnetic resonance imaging (MRI), computed tomography (CT) machine, ultrasonic machine, etc.), a navigation device, a global positioning system (GPS) receiver, an event data recorder (EDR), a flight data recorder (FDR), a vehicle infotainment device, electronic equipment for a ship (e.g., ship navigation device, gyro-compass, etc.), avionics, a security device, an automobile head unit, a home or industrial robot, an automatic teller's machine (ATM) in banks, point of sales (POS) in a shop, or Internet of things devices (e.g., light bulb, various sensors, electric or gas meter, sprinkler device, fire alarm, thermostat, streetlamp, toaster, sporting goods, hot water tank, heater, boiler, etc.). According to some embodiments, the electronic device may include at least one of a part of furniture or a building/structure, an electronic board, an electronic signature receiving device, a projector, and various kinds of measuring instruments (e.g., water meter, electric meter, gas meter, radio wave meter, etc.). In various embodiments, the electronic device may be flexible, or may be a combination of one or more of the aforementioned various devices. The electronic device according to various embodiments of the disclosure is not limited to the aforementioned devices. In various embodiments of the disclosure, the term "user" may refer to a person using an electronic device or a device (e.g., artificial intelligence electronic device) using an electronic device.

FIG. 1 is a view illustrating an example of a network environment controlling electric power between electronic devices according to various embodiments.

Referring to FIG. 1, the network environment 100 may include at least one electronic device 101 or 102 or a server 108. For example, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network).

According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one of the components may be omitted from the electronic device 101, or one or more other components may be added in the electronic device 101. In some embodiments, some of the components may be integrated and implemented as in, for example, the sensor module 176 (e.g., a fingerprint sensor, an iris sensor, or an illuminance sensor) in embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing and computation. The processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, and additionally or alternatively adapted to consume less power than the main processor 121, or to be specific to a specified function. Here, the auxiliary processor 123 may be operated separately from or embedded in the main processor 121.

In such a case, the auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101, for example, software (e.g., the program 140) and input data or output data for a command related thereto. The memory 130 may include the volatile memory 132 or the non-volatile memory 134.

The program 140 is software stored in the memory 130, and may include, for example, an operating system (OS) 142, middleware 144, or an application 146.

The input device 150 is a device configured to receive a command or data to be used by other component (e.g., the processor 120) of the electronic device 101, from the outside (e.g., a user) of the electronic device 101, and may include, for example, a microphone, a mouse, or a keyboard.

The sound output device 155 is a device configured to output sound signals to the outside of the electronic device 101, and may include, for example, a speaker or a receiver. The speaker may be used for general purposes, such as playing multimedia or playing record, and the receiver may be used only for an incoming calls. According to an embodiment, the receiver may be implemented as separate from, or as part of the speaker.

The display device 160 is a device configured to visually provide information to a user of the electronic device 101, and may include, for example, a display, a hologram device, or a projector and control circuitry to control a corresponding one of the display, hologram device, and projector. According to an embodiment, the display device 160 may include touch circuitry adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) wiredly or wirelessly coupled with the electronic device 101.

The sensor module 176 may generate an electrical signal or data value corresponding to an operational state (e.g., power or temperature) of the electronic device 101 or an environmental state external to the electronic device 101. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support specified protocols to be used for the electronic device 101 to be coupled with the external electronic device (e.g., the electronic device 102) wiredly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102), for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 is a module configured to manage power supplied to the electronic device 101, and may be implemented as at least part of, for example, a power management integrated circuit (PMIC).

The battery 189 is a device configured to supply power to at least one component of the electronic device 101, and may include, for example, a primary cell which is not rechargeable, a secondary cell which is rechargeable, or a fuel cell.

The communication module 190 may support establishing a wired communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a wired communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules 190 may be implemented as a single chip, or may be implemented as separate chips, respectively.

According to an embodiment, the wireless communication module 192 may identify and authenticate the electronic device 101 in a communication network, using user information stored in the subscriber identification module 196.

The antenna module 197 may include at least one antenna module for transmitting or receiving a signal or power to or from the outside of the electronic device 101. According to an embodiment, the communication module 190 (e.g., the wireless communication module 192) may transmit or receive a signal to or from the external electronic device via an antenna appropriate for a communication scheme.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at another external device or a plurality of external electronic devices. According to an embodiment, if the electronic device 101 should perform a function or a service automatically, or in response to a request from a user or another device, the electronic device 101, instead of, or in addition to, executing the function or the service, may request the external electronic devices to perform at least part of the function related thereto. The external electronic devices receiving the request may perform the requested function or the service and transfer an outcome of the performing to the electronic device 101. The electronic device 101 may provide the requested function or the service, with or without further processing of the outcome. To that end, a cloud computing, distributed computing, or client-server computing technology may be used, for example.

Figure 2:
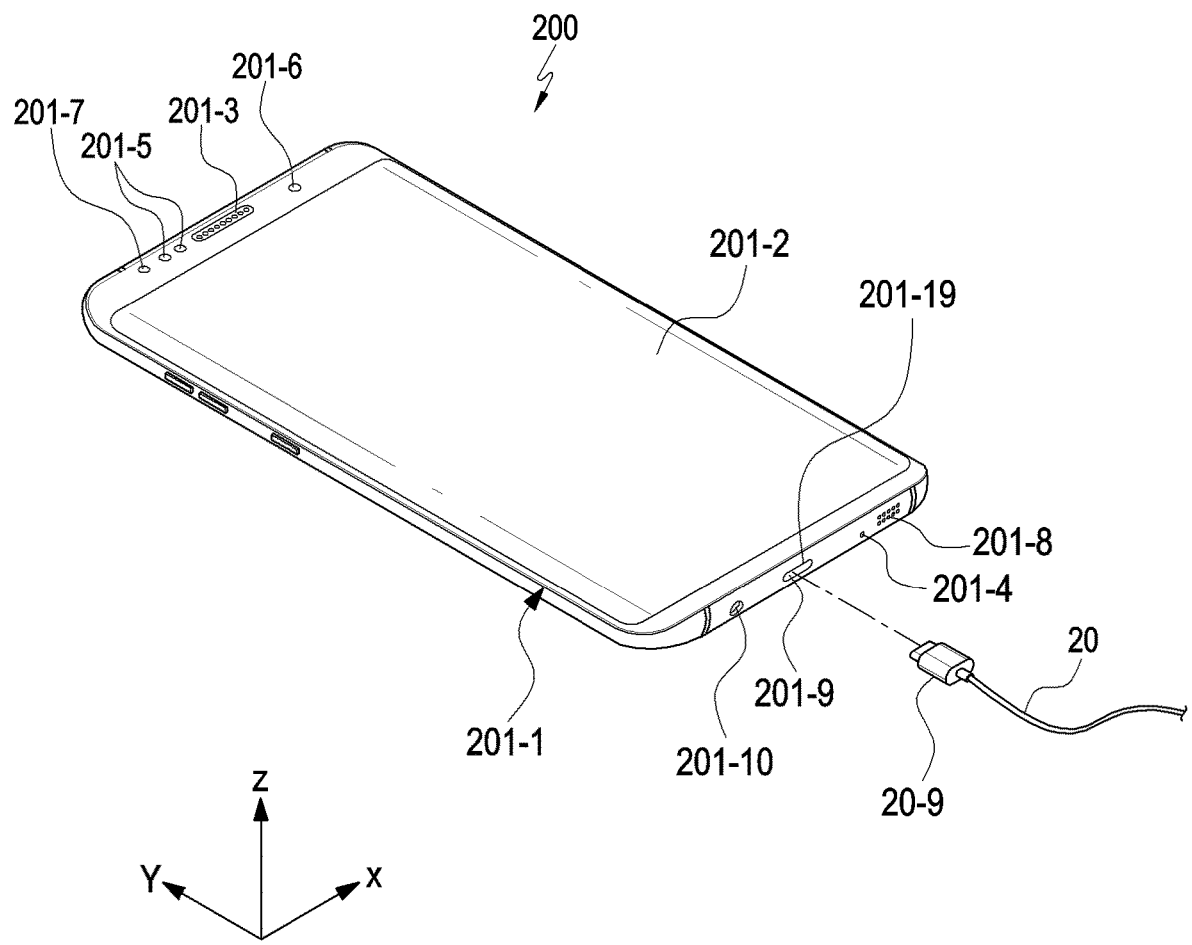
FIG. 2 is a perspective view of an electronic device according to various embodiments of the disclosure.

FIG. 2 is a perspective view of an electronic device according to various embodiments of the disclosure.

Referring to FIG. 2, "X" of a three-axis Cartesian coordinate system may indicate to a width direction of an electronic device 200 (e.g., the electronic device 101 or the electronic device 102 of FIG. 1), "Y" of the coordinate system may indicate a length direction of the electronic device 200, and "Z" of the coordinate system may indicate a thickness direction of the electronic device 200.

The electronic device 200 may include a housing 201-1. According to an embodiment, the housing 201-1 may be formed of a conductive member and/or a non-conductive member. According to an embodiment of the disclosure, the electronic device 200 may include a touch screen display 201-2 (e.g., the display device 160 of FIG. 1) disposed in at least a partial area of the housing 201-1 while being exposed. According to an embodiment, the touch screen display 201-2 may include a pressure sensor and operate as a pressure-responsive touch screen display. According to an embodiment, the electronic device 200 may be disposed in the housing 201-1 and include a receiver 201-3 for outputting a voice of the other person. According to an embodiment, the electronic device 200 may be disposed in the housing 201-1 and include a microphone device 201-4 for transmitting a user's voice to the other person.

According to various embodiments, the electronic device 200 may include components for performing various functions of the electronic device 200, wherein the components are disposed to be exposed on the touch screen display 201-2 or perform a function through a window but are not exposed. According to an embodiment, the components may include at least one sensor module 201-5. The sensor module 201-5 may include, for example, an illuminance sensor (e.g., an optical sensor), a proximity sensor (e.g., an optical sensor), an infrared sensor, an ultrasonic sensor, a finger scan sensor, or an iris recognition sensor. According to an embodiment, the components may include a camera device 201-6. According to an embodiment, the components may include an indicator 201-7 (e.g., an LED device) for visually providing status information of the electronic device to a user. According to an embodiment, at least one of the components may be arranged to be exposed through at least a partial area of the housing 201-1.

According to various embodiments, the electronic device 200 may include a speaker device 201-8 disposed on one side of the microphone device 201-4. According to one embodiment, the electronic device may include a connector 201-9 (e.g., the connection terminal 178 of FIG. 1) disposed on the other side of the microphone device 201-4 to enable a connection with an external device. According to an embodiment, the connector 201-9 may be a socket-type connector.

According to various embodiments, an opening 201-19 may be formed in at least a partial area of the housing 201-1 to allow the connector 201-9 to be exposed, and the connector 201-9 may be disposed within the opening 201-19. According to various embodiments, a header type external connector 20-9 may be coupled to the connector 201-9 in the forward or reverse direction. According to an embodiment, the external connector 20-9 may be connected to an external device, and as the connector 201-9 and the external connector 20-9 are combined with each other, the electronic device 200 and the external device may be connected by a wire 20. According to various embodiments, the external device may be various external devices which can access the electronic device 200. For example, the external device may include a travel adapter (TA) device for supplying power, an audio device, a computer, a charger, a memory, an electric fan, or an antenna (e.g., a digital multimedia broadcast antenna or an FM antenna).

According to various embodiments of the disclosure, the electronic device 200 may receive power from the external device at a high speed or supply power to the external device at a high speed.

Figure 3:
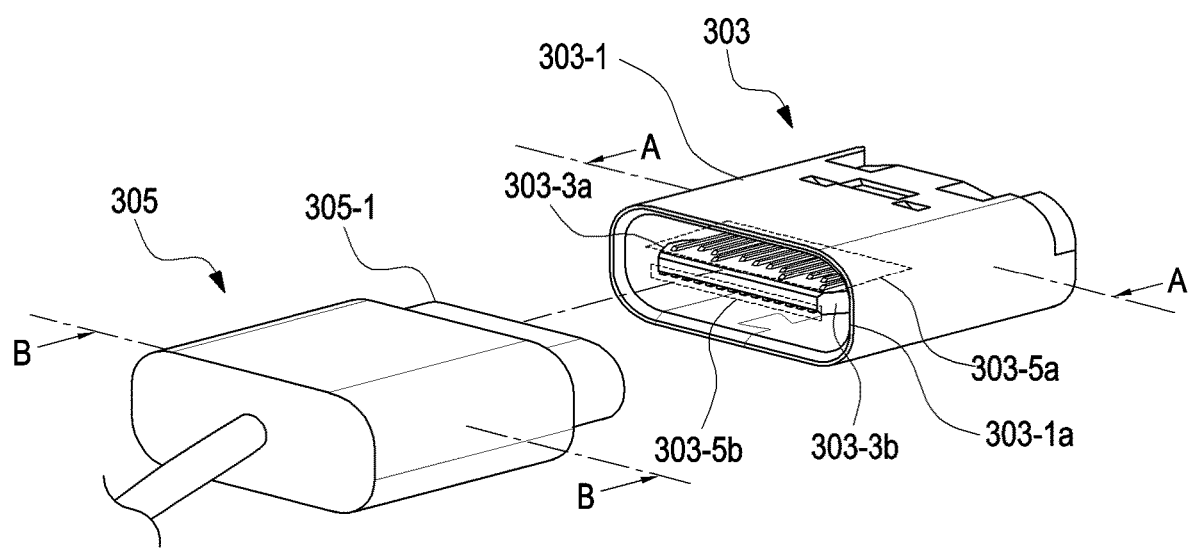
FIG. 3 is a perspective view of an external connector and a connector of an electronic device according to various embodiments of the disclosure.

FIG. 3 is a perspective view of an external connector and a connector of an electronic device according to various embodiments of the disclosure.

Referring to FIG. 3, a connector 303 (e.g., the connector 201-9 of FIG. 2) may be in the form of a socket, and may include a housing 303-1 forming an outer surface of the connector 303 and having an opening 303-1a formed on at least a part of the outer surface so as to be coupled in the forward or reverse direction with a header type external connector 305 (e.g., the outer connector 20-9 of FIG. 2). The connector 303 according to an embodiment may include a substrate 303-5 inside the opening 303-1a, and the substrate 303-5 may include a first surface 303-5a on which a plurality of first pins corresponding to the forward direction are arranged, and a second surface 303-5b on which a plurality of second pins corresponding to the reverse direction are arranged.

According to various embodiments, the connector 303 may further include a first and a second latch pin 303-3a and 303-3b to enable an electrical connection or a physical connection of the external connector 305. According to various embodiments, at least a part of the first and the second latch pin 303-3a and 303-3b may include a binding groove through which the external connector 305 can be bound. According to an embodiment, the first latch pin 303-3a may correspond to the forward direction, the second latch pin 303-3b may correspond to the reverse direction, and at least one of the first and second latch pins 303-3a and 303-3b may be selectively connected to wireless communication data.

According to various embodiments of the disclosure, a jack 305-1 of the external connector 305 may be inserted into and connected to the opening of the connector 303.

Figure 4:
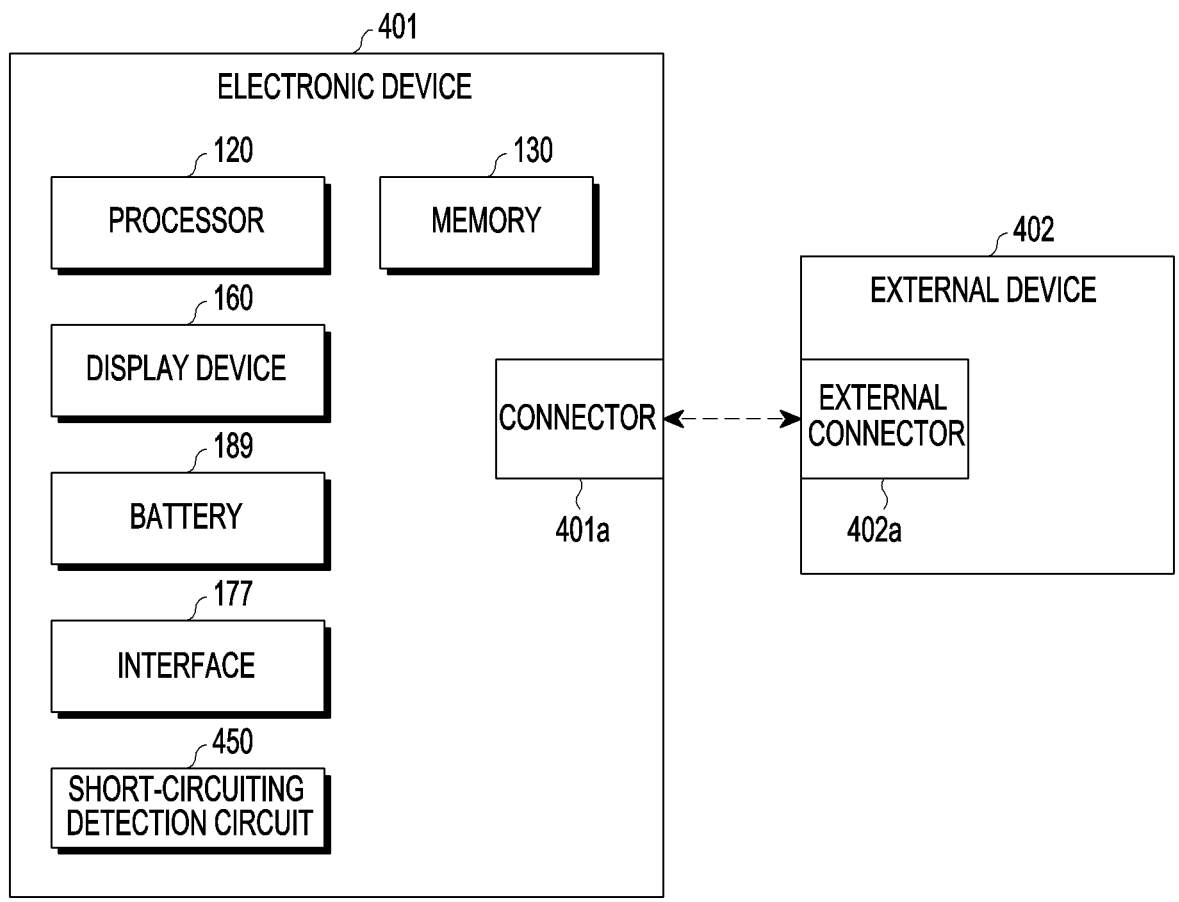
FIG. 4 is a block diagram illustrating an example of a configuration of an electronic device including a connector according to various embodiments of the disclosure.

FIG. 4 is a block diagram illustrating an example of a configuration of an electronic device including a connector according to various embodiments of the disclosure.

According to various embodiments of the disclosure, an electronic device 401 (e.g., the electronic device 101) may be connected to an external device 402 (e.g., the electronic device 102) through a connector (e.g., a connector supporting USB Type-C). The external device 402 may be a travel adapter (TA) device which supplies power to the electronic device 401 at a high speed by supporting an adaptive fast charging (AFC) or quick charger (QC) function.

Referring to FIG. 4, the electronic device 401 (e.g., the electronic device 101 of FIG. 1) may include the processor 120, the memory 130, the display device 160, the interface 177, or the battery 189, and include a connector 401a and a short-circuiting detection circuit 450.

The connector 401a (e.g., the connection terminal 178 of FIG. 1, the connector 201-9 of FIG. 2, or the connector 303 of FIGS. 3A and 3B) may be electrically or physically coupled to an external connector 402a of the external device 402 so that the electronic device 401 and the external device 402 are connected.

According to various embodiments of the disclosure, for example, the connector 401a may be a USB connector or a USB Type-C connector which includes a plurality of pins. For example, the connector 401a may be a socket-type connector.

According to various embodiments of the disclosure, the processor 120 may recognize a connection of the external device 402 (e.g., the electronic device 102 of FIG. 1) as the external connector 402a is coupled through the connector 401a. For example, the processor 120 may recognize a connection of the external device 402 through at least one pin among a plurality of signal pins included in the connector 401a, for example, a configuration channel (CC) pin, and identify the external device 402. Based on a result of the recognition of the external device 402, the processor 120 may determine a signal (or a module associated with the signal) which is for connection of at least one first signal pin among one or more first signal pins in the forward direction of the connector 401a or at least one second signal pin among one or more second signal pins in the reverse direction of the connector 401a.

According to various embodiments of the disclosure, the external connector 402a may be inserted into the connector 401a in a state where a foreign material is inserted into the connector 401a, or in various other situations, the connector 401a and the external connector 402a may be abnormally connected. For example, short-circuiting may occur in a pin adjacent to a $V_{BUS}$ pin of the connector 401a through which power of the external device 402 is supplied in an abnormal connection state.

According to various embodiments of the disclosure, the electronic device 401 may include the short-circuiting detection circuit 450 connected to pins adjacent to the $V_{BUS}$ pin, and the processor 120 may measure a value of an input signal by using the short-circuiting detection circuit 450, and determine whether short-circuiting has occurred. For example, the short-circuiting detection circuit 450 may be wired in parallel to a line connecting the processor 120 to the pins adjacent to the $V_{BUS}$ pin.

According to various embodiments of the disclosure, the circuit may include at least one resistor connected in parallel to a line connecting each of the adjacent pins to the $V_{BUS}$ pin. For example, a plurality of resistors (e.g., a first resistor and a second resistor) may be configured to have a resistance value (e.g., 147 k and 100 k) higher than a resistance value (50 k) of a resistor connected between the $V_{BUS}$ pin and the ground so that a problem does not occur in USB communication through the $V_{BUS}$ pin.

According to various embodiments of the disclosure, the electronic device 401 may measure a voltage value input to at least one terminal (e.g., a GPIO terminal) of terminals (or ports) of the processor 120, and compare the measured voltage value with a predetermined value, so as to determine whether short-circuiting occurs. For example, the predetermined value may include values for determining whether the voltage input to the GPIO terminal is a high voltage ($V_{IH}$) or a low voltage ($V_{IL}$) according to a value of a power supply voltage ($V_{CC}$) of the external device 402.

According to various embodiments of the disclosure, when $V_{CC}$ is 1.3 V, a minimum of 2.0 V is required to be input through the GPIO terminal, so that it may be determined that $V_{IH}$ is applied, and a maximum of 0.8 V is required to be input, so that it may be determined that $V_{IL}$ is applied. When $V_{CC}$ is 1.8 V, a minimum of 1.17 V is required to be input through the GPIO terminal, so that it may be determined that $V_{IH}$ is applied, and a maximum of 0.63 V is required to be input, so that it may be determined that $V_{IL}$ is applied. Values of $V_{IH}$ and $V_{IL}$ in the case where $V_{CC}$ is 1.8 V may be calculated by multiplying the value (1.8 V) of $V_{CC}$ by 0.65 in the case of $V_{IH}$, and multiplying the value (1.8 V) of $V_{CC}$ by 0.35 in the case of $V_{IL}$.

The display device 160 may visually provide information related to connection recognition and identification with the external device 402 to a user of the electronic device 401. For example, when short-circuiting occurs between pins of the connector 401a by a connection with the external device 402, the display device may display information informing that short-circuiting occurs.

The battery 189 may supply power to at least one component of the electronic device 401.

The interface 177 may support a designated protocol which enables a connection with the external device 402 (e.g., the electronic device 102 of FIG. 1). For example, an input-output interface 440 may include a universal serial bus (USB) interface (e.g., a micro-USB interface controller (MUIC)).

According to various embodiments of the disclosure, the processor 120 may determine, through the interface 440, whether the connected external device 402 is a host device or whether the connection with the external device 402 is for data transmission/reception through a USB connection or power transmission/reception at a high speed.

The short-circuiting detection circuit 450 may be connected in parallel to a line connecting the processor 120 to a pin for transmitting or receiving power at a high speed through the external connector 402a, among the plurality of pins of the connector 401a. For example, the short-circuiting detection circuit 450 may include at least one resistor.

According to various embodiments of the disclosure, the at least one resistor may include a first resistor connected in parallel to a line connecting the processor 120 to a pin in a first direction among pins for transmitting or receiving power at a high speed; and a second resistor connected in parallel to a line connecting the processor 120 to a pin in a second direction. For example, a signal corresponding to the first resistor may be output to a first GPIO terminal of the processor 120 according to a direction in which the external connector 402a is inserted into the connector 401a, and a signal corresponding to a voltage applied to the second resistor may be output to a second GPIO terminal of the processor 120.

According to various embodiments of the disclosure, the short-circuiting detection circuit 450 may further include a logic gate for outputting an output value to a specific terminal (e.g., a GPIO terminal) of the processor 120 by using voltage values of the first resistor and the second resistor as an input. For example, the logic gate may be configured so that a signal corresponding to a voltage of a specific resistor is output to a GPIO terminal of the processor 120, according to a direction in which the external connector 402a is inserted into the connector 401a, by using voltage values applied to the first and second resistors as an input.

According to various embodiments of the disclosure, as the short-circuiting detection circuit 450 includes the logic gate, the short-circuiting detection circuit 450 may detect whether short-circuiting occurs in the connector 401a into which the external connector 402a is inserted in both directions, by using one of the terminals of the processor 120.

According to various embodiments of the disclosure, the electronic device 401 may include at least one circuit (not shown) for transmitting or receiving power to or from the external device 402 to charge the battery 189. For example, the at least one circuit may include a power charging circuit (power delivery integrated circuit/chip: PDIC), a power management circuit (power management integrated circuit/chip: PMIC), or an identification circuit (cable and connector integrated chip: CCIC).

According to various embodiments of the disclosure, when it is determined that short-circuiting has occurred in at least one pin among the plurality of pins of the connector 401a, the electronic device 401 may transmit a control signal requesting to stop power supply to the external device 402 through the power charging circuit.

According to various embodiments of the disclosure, the power charging circuit may control power to be supplied to the battery 189, the power being input through an SSRX− pin which receives power at a high speed, among the plurality of pins of the connector 401a, or control power of the battery to be transmitted to the external device 402 at a high speed through an SSTX− pin which supplies power at a high speed. For example, the processor 120 may identify a signal input through the short-circuiting detection circuit 450 connected to a line connecting the power charging circuit to the connector 401a, and determine whether short-circuiting has occurred in the SSRX− pin or SSTX− pin.

According to various embodiments of the disclosure, according to whether short-circuiting occurs in the SSRX− pin or the SSTX− pin, the processor 120 may control power so as not to be transmitted or received between the battery 189 and the external device 402 at a high speed through the power management circuit.

According to various embodiments of the disclosure, the identification circuit may identify the external connector 402a (or the external device 402) connected to the connector 401a, based on a signal input from a CC pin among the plurality of pins of the connector 401a.

According to various embodiments of the disclosure, the processor 120 may identify a signal input through the short-circuiting detection circuit 450, control so that power is not output or input to the battery 189 at a high speed in a state where the pins of the connector 401a are short-circuited, and thus prevent the pins included in the connector 401a from being burnt out.

The memory 130 may include a volatile or nonvolatile memory. The memory 130 may store, for example, a command or data related to at least one other component of the electronic device 401. For example, the memory 130 may store software or a program, and store instructions for performing operations executed in the processor 120.

According to various embodiments of the disclosure, the instructions may be configured to allow the processor 120 to: when an external electronic device (e.g., the external device 402) is connected to the electronic device 401 through the connector 401a, identify a value corresponding to a voltage of at least one data terminal (e.g., a $V_{BUS}$ pin) of the connector 401a by using at least one detection terminal of the processor 120; and transmit, to the external electronic device, a control signal for controlling power supply from the external electronic device, based on the value identified using the at least one detection terminal.

According to various embodiments of the disclosure, the instructions may be configured to allow the processor 120 to transmit the control signal to the external electronic device through at least one first terminal of the power charging circuit.

According to various embodiments of the disclosure, the instructions may be configured to allow the processor 120 to, when the value identified using the at least one detection terminal exceeds a designated value, determine that short-circuiting has occurred in the at least one data terminal.

According to various embodiments of the disclosure, the instructions may be configured to allow the processor 120 to output, in the form of a screen, sound, or vibration, information indicating a short-circuiting state in the at least one data terminal through the input-output interface (e.g., the display device 160, a sound output device 155, or a haptic module 179 of FIG. 1).

According to various embodiments of the disclosure, the instructions may be configured to allow the processor 120 to determine whether the external electronic device is a host device of the electronic device, based on a voltage of an identification terminal.

According to various embodiments of the disclosure, the instructions may be configured to allow the processor 120 to stop a connection with the external electronic device when the external electronic device is the host device of the electronic device, and transmit, to the external electronic device, through the power charging circuit, the control signal requesting that power not be supplied to the electronic device at a high speed.

An electronic device 401 according to various embodiments of the disclosure may include: a connector 401a including at least one power terminal configured to receive power supplied from an external electronic device (e.g., the external device 402), and at least one data terminal configured to transmit or receive data to or from the external electronic device; and a processor 120 including at least one detection terminal connected to the at least one data terminal through at least one resistor, wherein the processor 120 is configured to: when the external electronic device is connected to the electronic device 401 through the connector, identify a value corresponding to a voltage of the at least one data terminal by using the at least one detection terminal; and transmit, to the external electronic device, a control signal for controlling power supply from the external electronic device, based on the value identified using the at least one detection terminal.

An electronic device 401 according to various embodiments of the disclosure may include: a universal serial bus (USB) Type-C connector (e.g., the connector 401a) including at least one data terminal configured to perform high-speed data transmission/reception, and at least one power terminal configured to perform power supply; a processor 120 including at least one first terminal connected to the at least one data terminal among a plurality of terminals of the USB Type-C connector; and a short-circuiting detection circuit 450 connected between the at least one data terminal of the USB Type-C connector and the at least one first terminal of the processor 120, wherein the processor 120 is configured to determine whether short-circuiting occurs in the at least one data terminal, based on a voltage value determined through the short-circuiting detection circuit.

An electronic device 401 according to various embodiments of the disclosure may include: a universal serial bus (USB) Type-C connector (e.g., the connector 401a) including at least one data terminal configured to perform high-speed data transmission/reception with an external electronic device (e.g., the external device 402), and at least one power terminal configured to perform power supply; a processor 120 including at least one first terminal connected to the at least one data terminal among a plurality of terminals of the USB Type-C connector; and a short-circuiting detection circuit 450 connected between the at least one data terminal of the USB Type-C connector and the at least one first terminal of the processor 120, wherein the processor 120 is configured to: when the external electronic device is connected to the electronic device 401 through the USB Type-C connector, identify a value corresponding to a voltage of the at least one data terminal by using the at least one first terminal; and transmit, to the external electronic device, a control signal for controlling power transmission/reception with the external electronic device, based on the value identified using the at least one first terminal.

Figure 5:
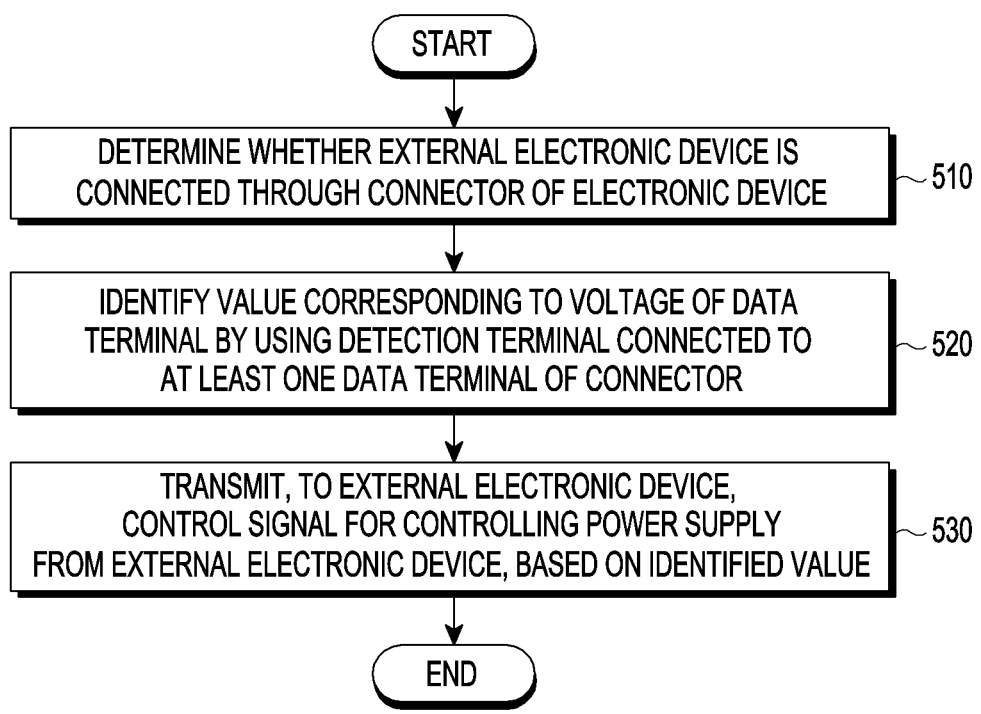
FIG. 5 is a flowchart illustrating an example of an operation of controlling an output through a connector by an electronic device according to various embodiments of the disclosure.

FIG. 5 is a flowchart illustrating an example of an operation of controlling an output through a connector by an electronic device according to various embodiments of the disclosure.

Referring to FIG. 5, in operation 510, an electronic device (e.g., the electronic device 101 or the electronic device 401) may determine whether an external electronic device (e.g., the electronic device 102 or the external device 402) is connected through a connector (e.g., the connection terminal 178 or the connector 401a) of the electronic device. For example, the electronic device (e.g., the processor 120) may identify the type of the external electronic device, the type of connection, or a power supply state for charging a battery of the electronic device, based on a signal corresponding to a voltage at specific terminals included in the connector.

In operation 520, the electronic device (e.g., the processor 120) may use a detection terminal of a processor (e.g., the processor 120) connected to at least one data terminal of the connector, so as to identify a value corresponding to a voltage of the data terminal. For example, based on a value corresponding to a voltage of at least one terminal (e.g., an SSTX− terminal or an SSRX− terminal) configured adjacent to the data terminal for power supply among pins connected to the connector, the electronic device may determine whether short-circuiting has occurred in the at least one terminal.

According to various embodiments of the disclosure, when it is determined that the value corresponding to the voltage of at least one terminal exceeds a designated value, the electronic device may determine that short-circuiting has occurred in the at least one terminal.

In operation 530, the electronic device (e.g., the processor 120) may transmit, to the external electronic device, a control signal for controlling power supply from the external electronic device, based on the value identified using the at least one detection terminal. For example, the electronic device may transmit, to the external device, a signal requesting to stop power supply, and the external device which has identified the signal may stop power supply to the electronic device.

Figure 6A:
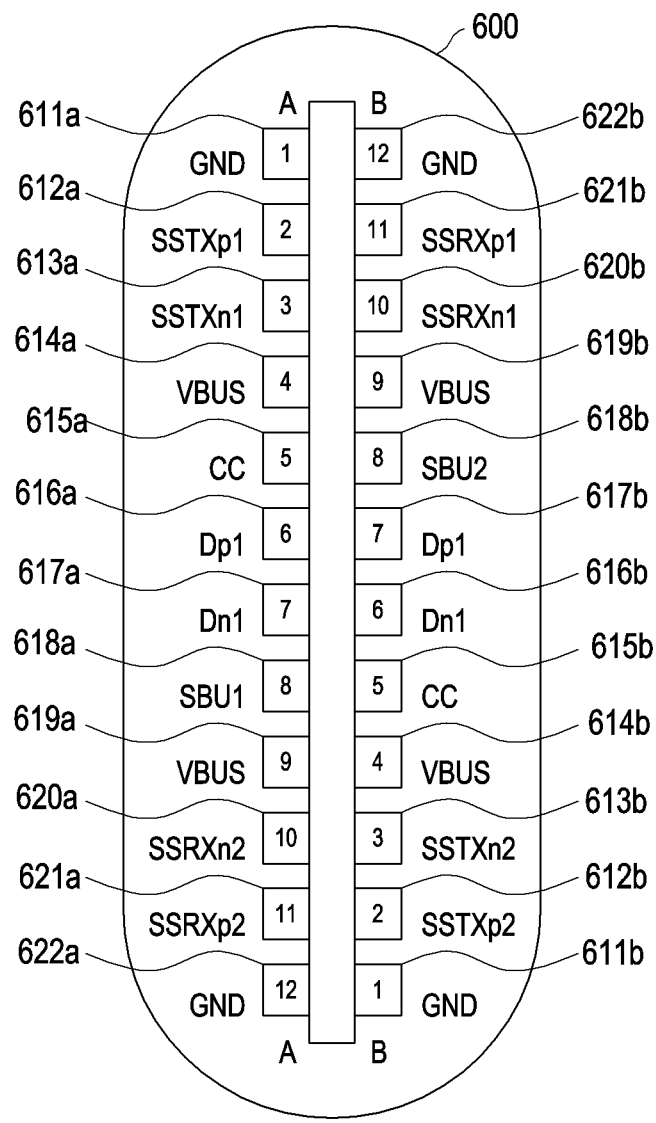

FIGS. 6A and 6B are views for describing pins of a connector according to various embodiments of the disclosure.

Referring to FIG. 6A, a connector 600 (e.g., the connection terminal 178 of FIG. 1, the connector 201-9 of FIG. 2, the connector 303 of FIGS. 3A and 3B, or the connector 401a of FIG. 4) may be a USB Type-C connector. The connector 600 may include a plurality of pins (or "terminals").

According to various embodiments of the disclosure, the connector 600 may include a plurality of first pins on a first surface (e.g., surface A or a first direction) corresponding to the forward direction, and a plurality of second pins on a second surface (e.g., surface B or a second direction) corresponding to the reverse direction. For example, the plurality of first pins may include a GND pin 611a, an SSTXp (or SSTX+) 1 pin 612a, an SSTXn (or SSTX−) 1 pin 613a, a $V_{BUS}$ pin 614a, a CC pin 615a, a Dp (or D+) 1 pin 616a, a Dn (or D−) 1 pin 617a, an SBU1 pin 618a, a $V_{BUS}$ pin 619a, an SSRXn2 pin 620a, an SSRXp2 pin 621a, and a GND pin 622a. For example, the plurality of second pins may include a GND pin 611b, an SSTXp2 pin 612b, an SSTXn2 pin 613b, a $V_{BUS}$ pin 614b, a CC pin 615b, a Dn1 pin 616b, a Dp1 pin 617b, an SBU2 pin 618b, a $V_{BUS}$ pin 619b, an SSRXn1 pin 620b, an SSRXp1 pin 621b, and a GND pin 622b.

According to an embodiment, the plurality of first pins may include one or more first ground pins, for example, the GND pins 611a and 622a and one or more first signal pins, for example, the SSTXp1 pin 612a, the SSTXn1 pin 613a, the $V_{BUS}$ pin 614a, the CC pin 615a, the Dp1 pin 616a, the Dn1 pin 617a, the SBU1 pin 618a, the $V_{BUS}$ pin 619a, the SSRXn2 pin 620a, and the SSRXp2 pin 621a. The plurality of second pins may include one or more second ground pins, for example, the GND pins 611b and 622b and one or more second signal pins, for example, the SSTXp2 pin 612b, the SSTXn2 pin 613b, the $V_{BUS}$ pin 614b, the CC pin 615b, the Dp1 pin 616b, the Dn1 pin 617b, the SBU2 pin 618b, the $V_{BUS}$ pin 619b, the SSRXn1 pin 620b, and the SSRXp1 pin 621b.

Referring to FIG. 6B, the SSTXp1 pin and SSTXp2 pin 612a and 612b and the SSTXn1 pin and SSTXn2 pin 613a and 613b may be pins for super speed TX, which enable fast transmission of data, the $V_{BUS}$ pins 614a and 614b may be pins for USB cable charging power supply, the CC pin 615a may be a pin serving as an identification terminal, the CC pin 615b may be a pin for supporting plug power, the Dp1 pins 616a and 616b and the Dn1 pins 617a and 617b may be pins for different bidirectional USB signals, the SBU1 pin and SBU2 pin 618a and 618b may be, as spare pins, pins which can be used for various signals (e.g., an audio signal, a display signal, etc.), and the SSRXn2 pin and SSRXn1 pin 620a and 620b and the SSRXp2 pin and SSRXp1 pin 621a and 621b may be pins for super speed RX, which enable fast reception of data.

According to an embodiment, the one or more first signal pins, for example, at least one first signal among the SSTXp1 pin 612a, the SSTXn1 pin 613a, the $V_{BUS}$ pin 614a, the CC pin 615a, the Dp1 pin 616a, the Dn1 pin 617a, the SBU1 pin 618a, the $V_{BUS}$ pin 619a, the SSRXn2 pin 620a, or the SSRXp2 pin 621a may be selectively connected to a circuit (e.g., the short-circuiting detection circuit 450) associated with a signal of a designated function. The one or more second signal pins, for example, at least one second signal pin among the SSTXp2 pin 612b, the SSTXn2 pin 613b, the $V_{BUS}$ pin 614b, the CC pin 615b, the Dp1 pin 616b, the Dn1 pin 617b, the $V_{BUS}$ pin 619b, the SSRXn1 pin 620b, or the SSRXp1 pin 621b may be selectively connected to the signal of the designated function.

According to an embodiment, the one or more first ground pins, for example, at least one first ground pin among the GND pins 611a and 622a may be selectively connected to a wireless communication data signal, and the one or more second ground pins, for example, at least one second ground pin among the GND pins 611b and 622b may be selectively connected to the wireless communication data signal.

The above-described embodiments describe, as an example, that the first signal pin, the second signal pin, the first ground pin, and the second ground pin are used as pins which can be selectively connected to the wireless communication data signal. However, according to an embodiment, at least a part of a latch structure may be designated as a latch pin which can be selectively connected to the wireless communication data signal, and the latch pin may be selectively connected to the wireless communication data signal.

Figure 7:
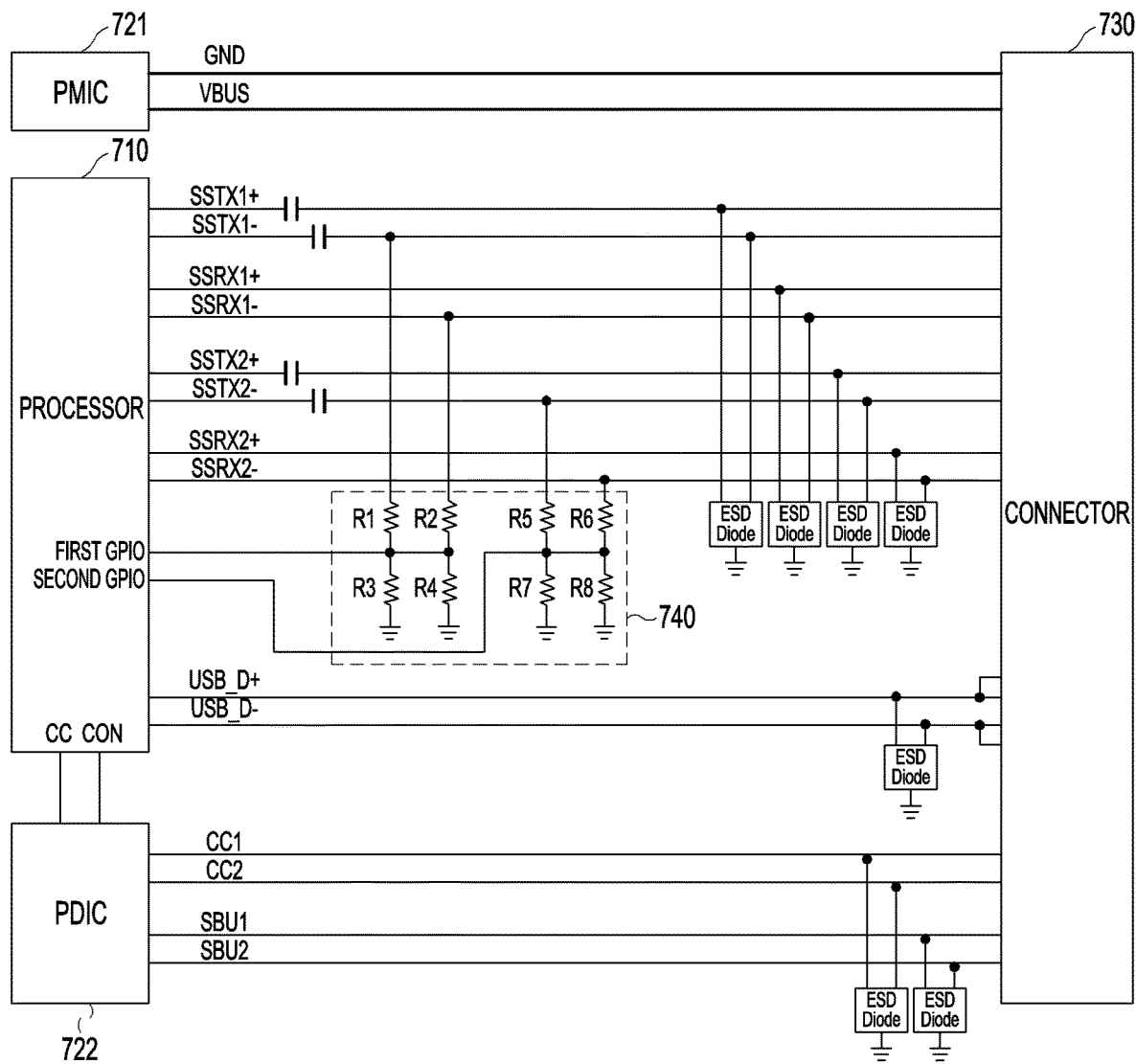
FIG. 7 illustrates a detailed structure of an electronic device according to various embodiments of the disclosure.

FIG. 7 illustrates a detailed structure of an electronic device according to various embodiments of the disclosure.

Referring to FIG. 7, an electronic device 700 (e.g., the electronic device 101 or the electronic device 401) may include a processor 710 (e.g., the processor 120), a PMIC 721, a PDIC 722, a connector 730 (e.g., the connection terminal 178 or the connector 401a), or a short-circuiting detection circuit 740 (e.g., the short-circuiting detection circuit 450).

According to various embodiments of the disclosure, the connector 730 may include a plurality or pins. For example, a GND pin and a $V_{BUS}$ pin among the plurality of pins may be selectively connected to the PMIC 721, and a CC pin and an SBU pin may be selectively connected to the PDIC 722.

According to various embodiments of the disclosure, among the plurality of pins of the connector 730, a USB pin, SSTX1+/1−/2+/2− pins, and SSRX1+/1−/2+/2− pins may be selectively connected to the processor 710. For example, an AC coupling capacitor may be provided between the SSTX1+/1−/2+/2− pins and the processor 710, and an electro static discharge (ESD) diode for discharging static electricity to the ground may be connected in parallel to lines connecting the processor 710 to the pins of the connector 730.

The PDIC 722 may be connected to at least one CC pin and at least one SBU pin of the connector. For example, the PDIC 722 may identify an external device connected to the connector 730, based on a signal input through the at least one CC pin.

According to various embodiments of the disclosure, each of lines connecting the connector 730 and the processor 710 and the PDIC 722 may include the ESD diode for discharging static electricity to the ground.

According to various embodiments of the disclosure, the short-circuiting detection circuit 740 is configured to determine a short-circuiting state between a $V_{BUS}$ signal and adjacent USB signals, and may be connected to a pin adjacent to the $V_{BUS}$ pin (e.g., the SSTX1−/2− pin or the SSRX1−/2− pin) among the pins of the connector 730. For example, the short-circuiting detection circuit 740 may be connected in parallel to at least one first line connecting the $V_{BUS}$ pin of the connector 730 to the processor 710.

According to various embodiments of the disclosure, the short-circuiting detection circuit 740 may include at least one series resistor connected to the at least one first line. For example, the at least one series resistor may be configured by connecting, in series, resistors (e.g., R1, R2, R5 and R6) having a first value (e.g., 147 k) and resistors (e.g., R3, R4, R7 and R8) having a second value (e.g., 100 k). For example, points between the resistors having the first value and the resistors having the second value and a GPIO terminal of the processor 710 may be connected.

According to various embodiments of the disclosure, the resistors having the first value and the second value may be provided in the short-circuiting detection circuit 740, based on a voltage value identifiable by the GPIO terminal. For example, the series resistor connected to each line may be configured so that the total resistance value of the series resistor is greater than or equal to a specific value (e.g., 50 k), based on the voltage value identifiable by the GPIO terminals.

The processor 710 may determine whether short-circuiting occurs in the at least one data terminal, based on a voltage value determined through the short-circuiting detection circuit 740. For example, when it is determined that a voltage value applied to at least one resistor included in the short-circuiting detection circuit 740 exceeds a designated value, the processor 710 may determine that short-circuiting has occurred in the pin adjacent to the $V_{BUS}$ pin (e.g., the SSTX1–/2– pin or the SSRX1–/2– pin).

According to various embodiments of the disclosure, the connector 730 may include SSTX/SSRX pins corresponding to a first direction (e.g., forward direction) or SSTX/SSRX pins corresponding to a second direction (e.g., reverse direction), and in the short-circuiting detection circuit 740, at least one pin adjacent to the $V_{BUS}$ pin among the SSTX/SSRX pins may be connected to at least one GPIO terminal (e.g., the first GPIO terminal and the second GPIO terminal) of the processor 710 according to a direction (e.g., the first direction or the second direction) in which the pin is disposed in the connector 730.

According to various embodiments of the disclosure, the processor 710 may measure a voltage applied to the resistor having the first value and the resistor having the second value, based on a signal input to the at least one GPIO terminal, and determine a short-circuiting state in a peripheral pin (e.g., the SSTX1– pin, SSRX1– pin, SSTX2– pin, or SSRX2– pin) due to the $V_{BUS}$ signal, based on the measured voltage value.

Figure 8:
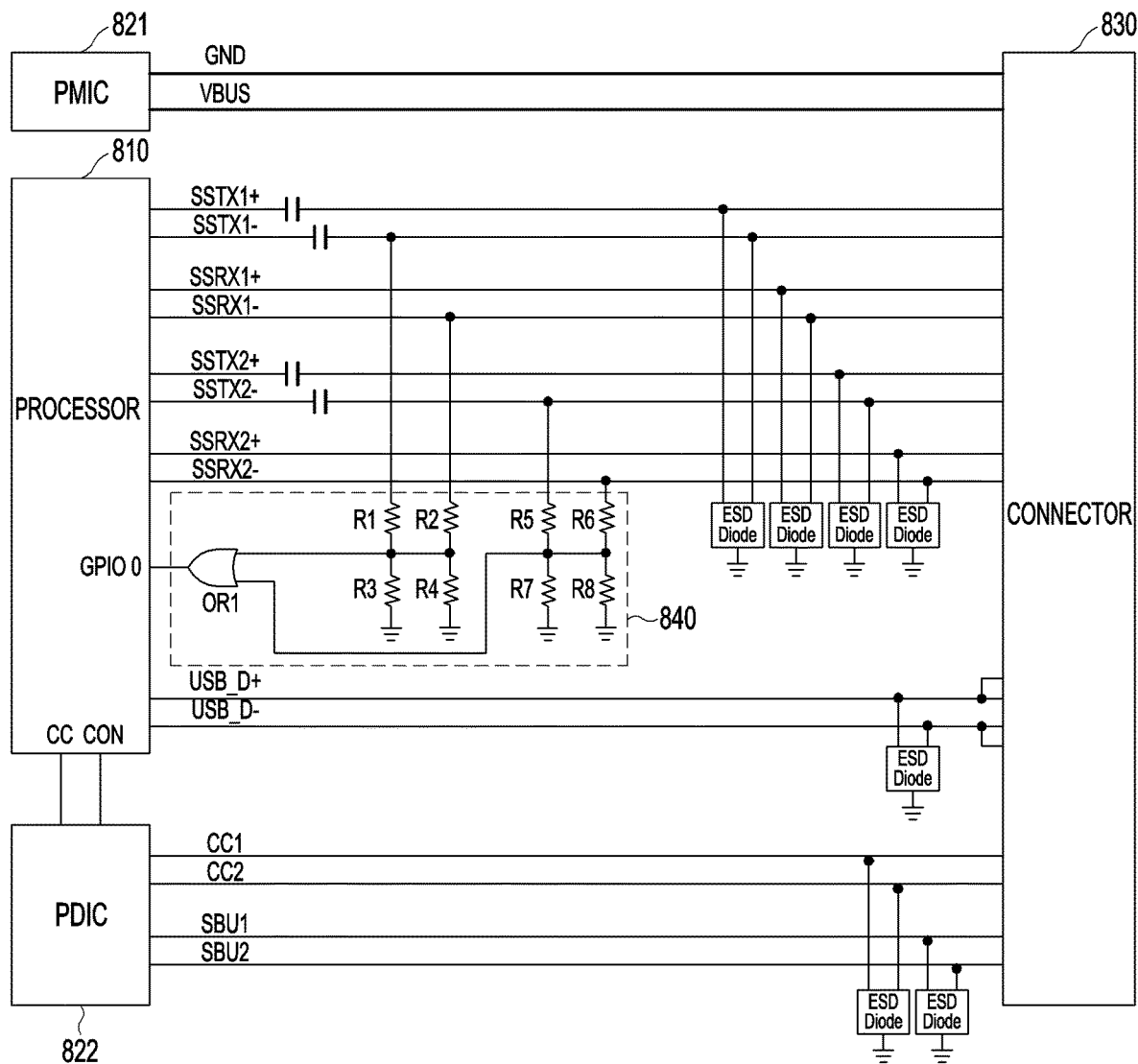
FIG. 8 illustrates a detailed structure of an electronic device according to various embodiments of the disclosure.

FIG. 8 illustrates a detailed structure of an electronic device according to various embodiments of the disclosure.

Referring to FIG. 8, an electronic device 800 (e.g., the electronic device 101 or the electronic device 401) may include a processor 810 (e.g., the processor 120), a PMIC 821 (e.g., the power management module 188), a PDIC 822, a connector 830 (e.g., the connection terminal 178 or the connector 401a), or a short-circuiting detection circuit 840 (e.g., the short-circuiting detection circuit 450).

According to various embodiments of the disclosure, the connector 830 may include a plurality or pins. For example, a GND pin and a $V_{BUS}$ pin among the plurality of pins may be selectively connected to the PMIC 821, and a CC pin and an SBU pin may be selectively connected to the PDIC 822.

According to various embodiments of the disclosure, the short-circuiting detection circuit 840 is configured to determine a short-circuiting state between a $V_{BUS}$ signal and adjacent USB signals, and may be connected to a pin adjacent to the $V_{BUS}$ pin among the pins of the connector 830. For example, the short-circuiting detection circuit 840 may be connected in parallel to at least one first line connecting the $V_{BUS}$ pin of the connector 830 to the processor 810.

According to various embodiments of the disclosure, in the short-circuiting detection circuit 840, pins adjacent to the $V_{BUS}$ pin may be connected to a GPIO terminal of the processor 810 in different lines according to directions in which the pins are arranged in the connector 830. For example, pins arranged in a first direction of the connector 830 may be connected to a second line, and pins arranged in a second direction may be connected to a third line.

According to various embodiments of the disclosure, in the electronic device 800, a logic gate element may be provided in the short-circuiting detection circuit 840 in order to use the minimum number of GPIO terminals of the processor 810. For example, the second line and the third line may be connected to an input terminal of the logic gate element, and a voltage value in the second and third lines may be input as an input value of the logic gate element.

According to various embodiments of the disclosure, a voltage may be applied to a series resistor in the second line or the third line according to a direction in which an external connector of an external device is inserted in the connector 830. For example, the logic gate element of the short-circuiting detection circuit 840 may be configured to output "1" or "0" to the GPIO terminal of the processor 810 according to a voltage value of the series resistor in a specific line.

According to various embodiments of the disclosure, when a voltage value at an SSTX– pin or an SSRX– pin is input to the logic gate element, the processor 810 may determine whether the voltage value of each pin is high or low, based on a predesignated configuration value of the GPIO terminal. For example, the logic gate element may receive an input of the voltage values of the pins, and output "1" when at least one of the values is a high voltage or output "0" when all the values are low voltages.

According to various embodiments of the disclosure, when "1" is input to the GPIO terminal, the electronic device 800 may determine that short-circuiting has occurred in a peripheral pin (e.g., an SSTX pin or SSRX pin) due to the $V_{BUS}$ signal. For example, the electronic device 800 may control the PMIC 821 to terminate a USB connection with the external device or to stop power supply through the $V_{BUS}$ pin.

Figure 9:
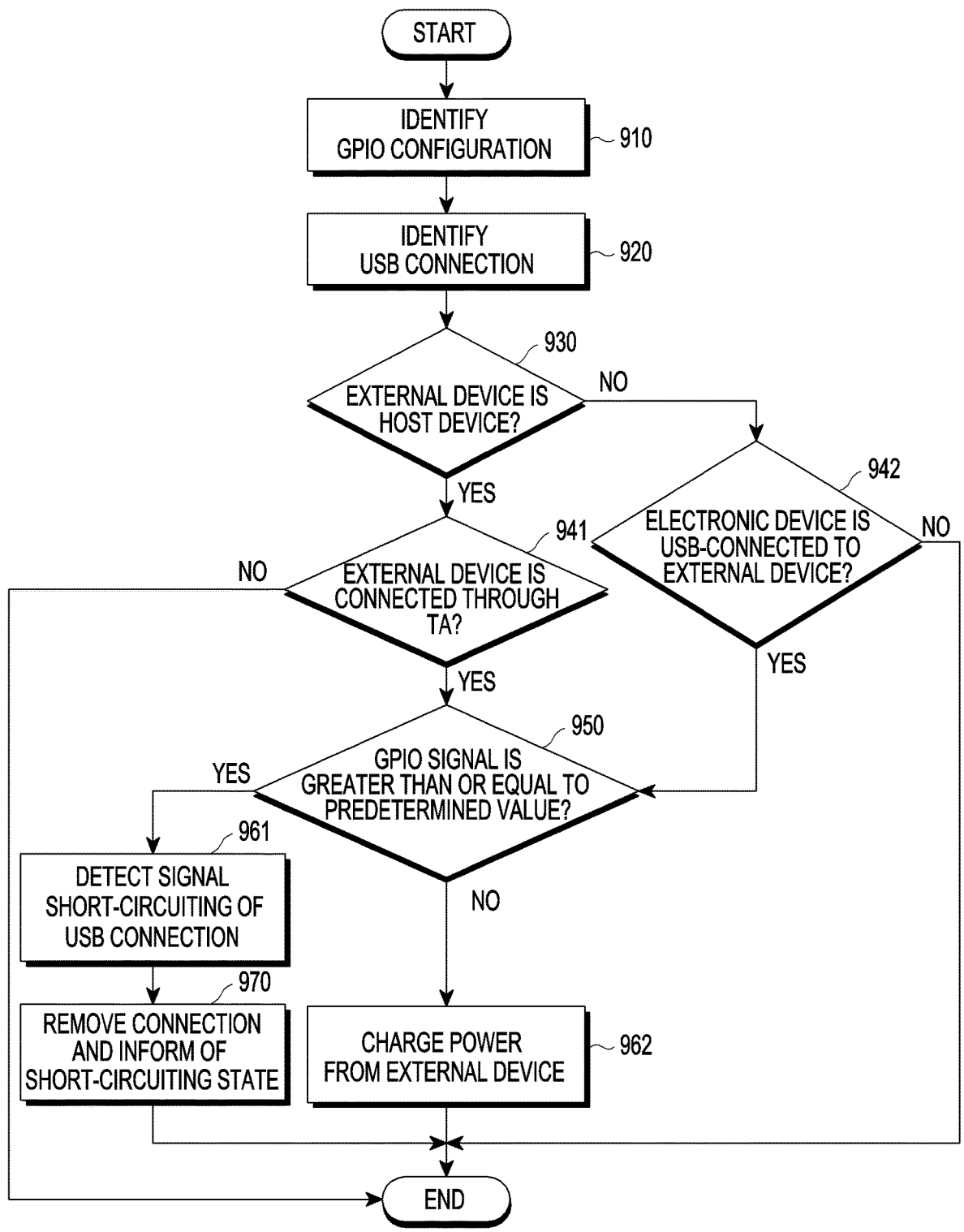
FIG. 9 illustrates an example of an operation of detecting short-circuiting by an electronic device, based on a state of connection with an external device, and controlling power supply through a connector, according to various embodiments of the disclosure.

FIG. 9 illustrates an example of an operation of detecting short-circuiting by an electronic device, based on a state of connection with an external device, and controlling power supply through a connector, according to various embodiments of the disclosure.

Referring to FIG. 9, in operation 910, an electronic device (e.g., the electronic device 101 or the electronic device 401) may identify configuration for a GPIO terminal disposed in a processor (e.g., the processor 120) of the electronic device. For example, the configuration may be required to determine whether a voltage value input to the GPIO terminal, as a designated voltage value, is high or low.

According to various embodiments of the disclosure, the GPIO terminal may be connected to a circuit for determining whether short-circuiting occurs in pins adjacent to a $V_{BUS}$ pin among pins of a connector of the electronic device. For example, in the circuit, as short-circuiting occurs in SSTX– pins or SSRX– pins adjacent to the $V_{BUS}$ pin, a signal exceeding a designated voltage value is input, and the electronic device (e.g., the processor 120) may identify a signal input through the GPIO terminal.

In operation 920, the electronic device (e.g., the processor 120) may recognize an external connector inserted into the connector, and identify that the electronic device is USB-connected to an external device.

In operation 930, the electronic device (e.g., the processor 120) may determine whether the external device is a host device. For example, the electronic device may determine whether the external device is the host device, based on a voltage value input through a CC pin among the pins of the connector.

As a result of performing operation 930 described above, when the external device is the host device, in operation 941, the electronic device (e.g., the processor 120) may determine whether a connection with the external device is a connection for receiving power.

As a result of performing operation 930 described above, when the external device is a slave device of the electronic device, in operation 942, the electronic device (e.g., the processor 120) may determine whether the electronic device is USB-connected to the external device for data communication.

As a result of performing operation 941 described above, when connected to the external device to receive power, or as a result of performing operation 942 described above, when USB-connected to the external device for data communication, in operation 950, the electronic device (e.g., the processor 120) may determine whether a value of a signal input to the GPIO terminal of the processor is greater than or equal to a predetermined value.

As a result of performing operation 950 described above, when the value of the signal input to the GPIO terminal is greater than or equal to the predetermined value, in operation 961, the electronic device (e.g., the processor 120) may detect that short-circuiting has occurred in the connector of the electronic device. For example, the electronic device may determine that short-circuiting has occurred in pins (e.g., SSTX– pins or SSRX– pins) for transmitting or receiving power at a high speed among the plurality of pins of the connector.

As a result of performing operation 950 described above, when the value of the signal input to the GPIO terminal is not greater than or equal to the predetermined value, in operation 962, the electronic device (e.g., the processor 120) may receive power supplied from the external device at a high speed. The supplied power may be transferred to a battery of the electronic device.

According to operation 961, when it is determined that short-circuiting has occurred in the connector, in operation 970, the electronic device (e.g., the processor 120) may remove a connection with the external device and output information informing that short-circuiting has occurred in the connection with the external device.

According to various embodiments of the disclosure, when a USB connection is being made to the external device as a result of performing operation 942, in operation 970, the electronic device (e.g., the processor 120) may maintain the USB connection with the external device and stop only a connection for transmitting or receiving power at a high speed with the external device.

According to various embodiments of the disclosure, when connected to the external device, the electronic device may determine whether short-circuiting has occurred in the pins included in the connector of the electronic device, and, according to a state of connection with the external device, maintain the USB connection and stop a connection for power transmission. In addition, the electronic device may output a short-circuiting state so that a user identifies a state of the connector.

Figure 10:
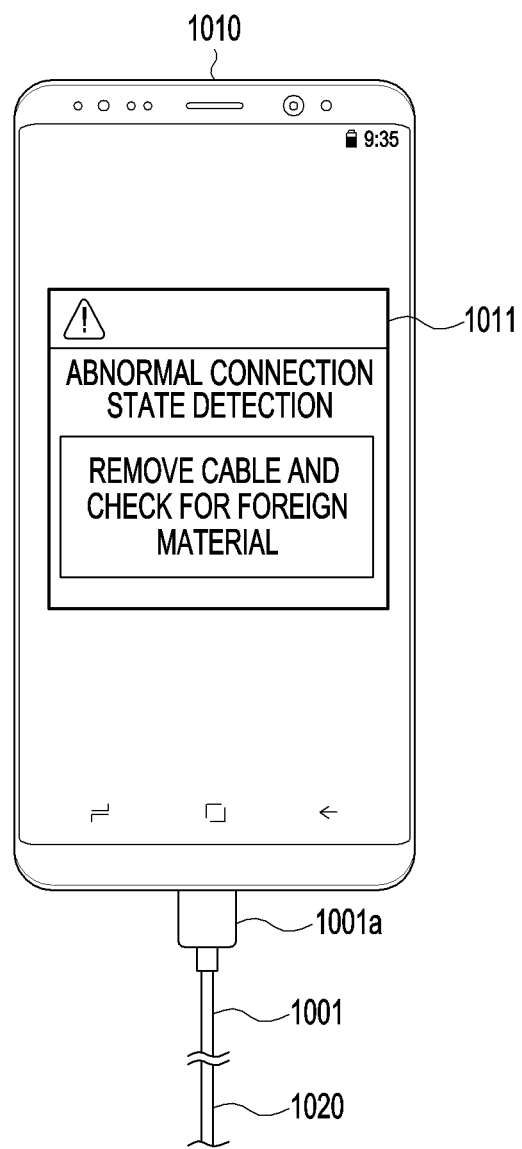
FIG. 10 illustrates an example of a screen displayed according to a short-circuiting state of a connector in an electronic device according to various embodiments of the disclosure.

FIG. 10 illustrates an example of a screen displayed according to a short-circuiting state of a connector in an electronic device according to various embodiments of the disclosure.

Referring to FIG. 10, an electronic device 1010 (e.g., the electronic device 101 or the electronic device 401) may be connected to an external electronic device 1020 through a cable 1001 supporting USB Type-C. For example, the external electronic device 1020 (e.g., the electronic device 102 or the electronic device 402) may be a device (e.g., a TA) for supplying power to the electronic device 1010 at a high speed through the cable 1001.

According to various embodiments of the disclosure, in a connector (e.g., the connection terminal 178 or the connector 401*a*) of the electronic device 1010, when an external connector 1001*a* of the cable 1001, which connects the external electronic device 1020 (e.g., the electronic device 102 or the external device 402), is inserted into the connector in a state where a foreign material (e.g., dust or moisture) is inserted therein, at least a part of a plurality of pins included in the connector may be short-circuited by power supplied from the external electronic device 1020.

According to various embodiments of the disclosure, the electronic device 1010 may determine whether short-circuiting occurs in the connector through a circuit (e.g., the short-circuiting detection circuit 450) connected to pins for receiving power from the external electronic device 1020 at a high speed among the pins of the connector. For example, as short-circuiting occurs in the connector, the electronic device 1010 may output information informing that short-circuiting occurs, through an input-output interface (e.g., a display, a speaker, or a motor), in various forms (e.g., a screen, a sound, or a vibration).

According to various embodiments of the disclosure, as short-circuiting occurs in the connector, the electronic device 1010 may display a screen 1011 informing of short-circuiting occurrence. For example, the screen 1011 may include a content requesting to identify whether a foreign material is inserted into the connector by removing the cable 1001 as it is determined that short-circuiting has occurred in the connector.

According to various embodiments of the disclosure, as a user of the electronic device 1010 identifies that short-circuiting has occurred in the connector through the screen 1011, the user may identify a connection state of the cable 1001 and high-speed power may be supplied to the pins of the connector in a short-circuiting state to prevent the pins of the connector from being burned out.

Figure 11:
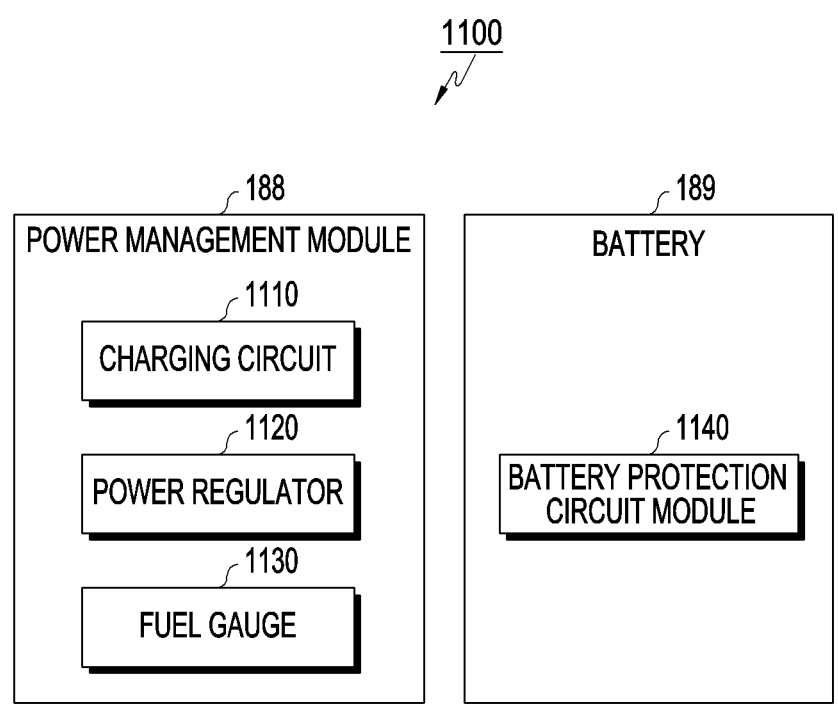
FIG. 11 is a block diagram illustrating an example of a power management module and a battery configuration according to various embodiments of the disclosure.

FIG. 11 is a block diagram illustrating an example of a power management module and a battery configuration according to various embodiments of the disclosure.

Referring to FIG. 11, the power management module 188 may include a charging circuit 1110, a power regulator 1120, or a fuel gauge 1130. The charging circuit 1110 may charge the battery 189 by using power supplied from an external power source for the electronic device 101. According to an embodiment, the charging circuit 1110 may select a charging scheme (e.g., a normal charging or a rapid charging), based on at least a part of the type of external power source (e.g., a power adapter, a USB, or a wireless charging), the magnitude of power which can be supplied from the external power source (e.g., about 20 Watts or more), or the attribute of the battery 189, and charge the battery 189 by using the selected charging scheme. For example, the external power source may be connected by a wire through the connection terminal 178, or may be wirelessly connected through an antenna module 197.

The power regulator 1120 may generate a plurality of powers having different voltages or different current levels by adjusting a voltage level or a current level of power supplied from the external power source or the battery 189. The power regulator 1120 may adjust the power of the external power source or the battery 189 to a voltage or current level suitable for each of the components included in the electronic device 101. According to an embodiment, the power regulator 1120 may be implemented in the form of a low drop out (LDO) regulator or a switching regulator.

The fuel gauge 1130 may measure use state information of the battery 189 (e.g., the capacity of the battery, the number of charge and discharge times, a voltage, or a temperature).

The power management module 188, for example, may determine charging state information (e.g., lifetime, overvoltage, low voltage, overcurrent, overcharge, over discharge, overheat, short-circuiting, or swelling) related to charging of the battery 189, based at least in part on the measured use state information, by using the charging circuit 1110, the voltage regulator 1120, or the fuel gauge 1130, determine whether the battery 189 is in an abnormal state or a normal state, based at least in part on the determined charging state information, and then adjust (e.g., reduce a charging current or voltage, or stop charging) the charging of the battery 189 when it is determined that the battery in the abnormal state. According to an embodiment, at least a part of functions of the power management module 188 may be performed by an external control device (e.g., the processor 120).

According to an embodiment, the battery 189 may include a battery protection circuit module (PCM) 1140. The battery protection circuit module 1140 may perform various functions (e.g., a pre-blocking function) to prevent degradation or burnout of the battery 189. The battery protection circuit module 1140 may be additionally or alternatively configured as at least a part of a battery management system (BMS) for performing cell balancing, battery capacity measurement, charge/discharge frequency measurement, temperature measurement, or voltage measurement.

According to an embodiment, at least a part of the use state information or the charging state information of the battery 189 may be measured using a corresponding sensor (e.g., a temperature sensor) among the fuel gauge 1130, the power management module 188, or the sensor module 1176. In this case, according to an embodiment, the corresponding sensor (e.g., the temperature sensor) of the sensor module 176 may be included as a part of the battery protection circuit module 1140, or may be disposed in the vicinity of the battery 189 as a separate device.

Each of the constituent elements described in various embodiments of the disclosure may include one or more components, and the names of the corresponding elements may vary depending on the type of electronic device. In various embodiments, the electronic device may include at least one of the constituent elements disclosed herein. Some of the elements may be omitted from or other additional elements may be further included in the electronic device. Also, some of the constituent elements of the electronic device according to various embodiments may be combined into one entity, which may perform functions identical to those of the relevant elements before the combination.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. The "module" may be mechanically or electronically implemented. For example, according to an embodiment, the "module" may be implemented in the form of an application-specific integrated circuit (ASIC). For example, the "module" may include at least one of an application-specific integrated circuit (ASIC) chip, field-programmable gate arrays (FPGAs), and a programmable logic device for performing known operations or operations to be developed in the future.

Devices (e.g., modules or functions thereof) and methods (e.g., operations) according to various embodiments may be partially implemented as instructions that are stored in the form of a program module in a computer-readable storage medium. The instructions, when executed by a processor (e.g., processor 120), may cause the processor to perform one or more functions corresponding to the instructions. The computer-readable storage medium may be, for example, a memory (e.g., memory 130).

The computer-readable storage medium may include a hard disc, a floppy disc, a magnetic medium (e.g., magnetic tape), an optical medium (e.g., compact disc read only memory (CD-ROM), digital versatile disc (DVD)), a magneto-optical medium (e.g., floptical disk), a hardware device (e.g., read only memory (ROM), random access memory (RAM), or flash memory), and the like. The program instructions may include machine language codes generated by a complier or computer-executable codes that can be executed using an interpreter or the like. The hardware device may be configured to operate as one or more software modules for operations according to various embodiments, and vice versa.

According to various embodiments, a module or a program may include at least one of the above-described elements, exclude some of them, or further include additional other elements. According to various embodiments, operations performed by the module, the program, or another element may be carried out sequentially, in parallel, repeatedly, or heuristically. Further, some of the operations may be executed in a different order or omitted, or other operations may be added.

According to various embodiments of the disclosure, in a non-transitory computer-readable storage medium storing commands, the commands may include: when connected to an external device through a connector of an electronic device, determining a type of the external device by using a first signal input through the connector; determining whether a connection with the external device is short-circuited, through a first circuit; and when it is determined that the connection with the external device is short-circuited, controlling power reception from the external device through at least one second pin by using a second circuit.

The embodiments disclosed herein have been presented to explain the technical contents of the disclosure and help understanding of the disclosure, and are not intended to limit the scope of the disclosure. Therefore, the scope of the disclosure should be construed to include all changes and modifications or various other embodiments based on the technical idea of the disclosure.

The invention claimed is:
1. An electronic device comprising:
a connector comprising at least one power terminal configured to receive power supplied from an external electronic device, and at least one SSTX-terminal and at least one SSRX— terminal configured to transmit or receive data to or from the external electronic device; and
a processor comprising at least one first terminal and at least one detection terminal, wherein the at least one first terminal is connected to the at least one SSTX-terminal and the at least one SSRX-terminal, wherein the at least one detection terminal is connected to the at least one SSTX-terminal and the at least one SSRX— terminal through at least one resistor, wherein the at least one resistor is configured to have a higher value than a value of a resistor connected between the at least one power terminal and a ground, and
wherein the processor is configured to:
when the external electronic device is connected to the electronic device through the connector, identify a value corresponding to a voltage of the at least one SSTX-terminal or the at least one SSRX-terminal by using the at least one detection terminal, and
transmit, to the external electronic device, a control signal for controlling power supply from the external electronic device, based on the value identified using the at least one detection terminal.
2. The electronic device of claim 1,
wherein the at least one SSTX-terminal and at least one SSRX-terminal are connected to the at least one first terminal through a first line, and wherein the at least one detection terminal is connected in parallel to the first line through the at least one resistor.

3. The electronic device of claim 1, further comprising:
a power delivery integrated circuit/chip (PDIC),
wherein the processor is further configured to transmit the control signal to the external electronic device through at least one first terminal of the power delivery integrated circuit/chip (PDIC).

4. The electronic device of claim 3,
wherein the connector further comprises an identification terminal configured to identify the external electronic device, and
wherein the processor is further configured to identify whether the external electronic device is a host device of the electronic device, based on a voltage of the identification terminal.

5. The electronic device of claim 4, wherein the processor is further configured to:
when the external electronic device is the host device of the electronic device, stop a connection with the external electronic device, and
transmit, to the external electronic device, through the power charging circuit, the control signal requesting that power not be supplied to the electronic device.

6. The electronic device of claim 1,
wherein the connector is a universal serial bus (USB) Type-C connector.

7. The electronic device of claim 1,
wherein each of the at least one SSTX-terminal and the at least one SSRX— terminal comprises a data terminal in forward direction and a data terminal in reverse direction, and
wherein the at least one resistor is connected to a logic gate configured to allow a voltage of the data terminal in the forward direction or a voltage of the data terminal in the reverse direction to be input to a second detection terminal among the at least one detection terminal, according to a direction in which an external connector of the external electronic device is inserted into the connector.

8. The electronic device of claim 1, wherein the processor is further configured to, when the value identified using the at least one detection terminal exceeds a designated value, determine that short-circuiting has occurred in the at least one SSTX-terminal or the at least one SSRX-terminal.

9. The electronic device of claim 8, further comprising:
an input-output interface,
wherein the processor is further configured to output, in a form of a screen, sound, or vibration, information related to a short-circuiting state in the at least one SSTX-terminal or the at least one SSRX— terminal through the input/output interface.

10. An electronic device comprising:
a universal serial bus (USB) Type-C connector comprising at least one SSTX-terminal and at least one SSRX-terminal configured to perform data transmission/reception, and at least one power terminal configured to perform power supply;
a processor comprising at least one first terminal connected to the at least one SSTX-terminal and at least one SSRX-terminal among a plurality of terminals of the USB Type-C connector; and
a short-circuiting detection circuit connected between the at least one SSTX-terminal and at least one SSRX-terminal of the USB Type-C connector and the at least one first terminal of the processor, wherein the short-circuiting detection circuit comprises at least one resistor configured to have a higher value than a value of a resistor connected between the at least one power terminal and a ground, and
wherein the processor is configured to identify whether short-circuiting occurs in the at least one SSTX-terminal or at least one SSRX— terminal, by a voltage value determined through the short-circuiting detection circuit.

11. The electronic device of claim 10,
wherein the short-circuiting detection circuit is connected to at least one detection terminal, and
wherein the processor is further configured to identify whether the short-circuiting occurs in the at least one SSTX-terminal or at least one SSRX-terminal, by the voltage value input through the short-circuiting detection circuit.

12. An electronic device comprising:
a universal serial bus (USB) Type-C connector comprising at least one SSTX-terminal and at least one SSRX-terminal configured to perform data transmission/reception with an external electronic device, and at least one power terminal configured to perform power supply;
a processor comprising at least one first terminal connected to the at least one SSTX-terminal and at least one SSRX-terminal among a plurality of terminals of the USB Type-C connector;
a power delivery integrated circuit/chip; and
a short-circuiting detection circuit connected between the at least one SSTX-terminal and at least one SSRX— terminal of the USB Type-C connector and the at least one first terminal of the processor, wherein the short-circuiting detection circuit comprises at least one resistor configured to have a higher value than a value of a resistor connected between the at least one power terminal and a ground, and
wherein the processor is configured to:
when the external electronic device is connected to the electronic device through the USB Type-C connector, identify a value corresponding to a voltage of the at least one SSTX-terminal or at least one SSRX-terminal by using the at least one first terminal,
transmit, to the external electronic device, a control signal for controlling power supply from the external electronic device, through at least one second terminal of the power charging circuit, based on the value identified using the at least one first terminal.

13. The electronic device of claim 12, further comprising:
an input-output interface,
wherein the processor is further configured to:
when the value identified using the at least one first terminal exceeds a designated value, determine that short-circuiting has occurred in the at least one SSTX-terminal or the at least one SSRX-terminal, and
output, in a form of a screen, sound, or vibration, information related to a short-circuiting state in the at least one SSTX-terminal or the at least one SSRX— terminal through the input-output interface.

14. The electronic device of claim 12,
wherein the USB Type-C connector further comprises an identification terminal configured to identify the external electronic device, and
wherein the processor is further configured to:
determine whether the external electronic device is a host device of the electronic device, based on a voltage of the identification terminal, when the external electronic device is the host device of the electronic device, stop a connection with the external electronic device, and transmit, to the external electronic device, through the power charging circuit, the control signal requesting that power not be supplied to the electronic device.

\* \* \* \* \*